US010795630B2

(12) United States Patent
Pollard (10) Patent No.: US 10,795,630 B2
(45) Date of Patent: Oct. 6, 2020

(54) CONFIGURING COMPUTING DEVICE TO UTILIZE A MULTIPLE DISPLAY ARRANGEMENT BY TRACKING EYE MOVEMENT

(71) Applicant: International Business Machines Corporation, Armonk, NY (US)

(72) Inventor: Heather Pollard, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 16/156,791

(22) Filed: Oct. 10, 2018

(65) Prior Publication Data
US 2020/0117413 A1    Apr. 16, 2020

(51) Int. Cl.
*G06F 3/14*    (2006.01)
*G06F 3/01*    (2006.01)
*G09G 5/38*    (2006.01)

(52) U.S. Cl.
CPC ............ *G06F 3/1423* (2013.01); *G06F 3/013* (2013.01); *G09G 5/38* (2013.01); *G09G 2320/08* (2013.01); *G09G 2354/00* (2013.01)

(58) Field of Classification Search
CPC ......... G06F 3/013; G06F 3/1432; G09G 5/38; G09G 2320/08; G09G 2354/00
See application file for complete search history.

(56) References Cited

U.S. PATENT DOCUMENTS

| 8,020,993 B1 * | 9/2011 | Fram ...................... G06F 3/013 351/200 |
| 8,189,108 B2 | 5/2012 | Lee et al. |
| 8,235,529 B1 | 8/2012 | Raffle et al. |
| 8,711,091 B2 | 4/2014 | Nomura et al. |
| 9,516,263 B2 | 12/2016 | Mathew et al. |
| 2003/0214458 A1 | 11/2003 | Giemborek et al. |
| 2009/0322714 A1 | 12/2009 | Lee et al. |

(Continued)

OTHER PUBLICATIONS

Pietinen et al., "A Method to Study Visual Attention Aspects of Collaboration: Eye-Tracking Pair Programmers Simultaneously," Proceedings of the Eye Tracking Research & Application Symposium, ETRA 2008, Savannah, Georgia, USA, Mar. 26-28, 2008, pp. 39-42.

(Continued)

*Primary Examiner* — Kenneth Bukowski
(74) *Attorney, Agent, or Firm* — Robert A. Voigt, Jr.; Winstead PC (57) ABSTRACT

A method, computing device and computer program product for configuring the computing device to utilize a multiple display arrangement. The eye movement of a user is tracked using an eye tracker in response to detecting the user adding a second display unit to the computing device that already includes a display unit. The logical display arrangement of the display units is then determined based on tracking the eye movement of the user. The computing device is then configured to utilize the display units in a particular display arrangement when the logical display arrangement of the display units is verified to match the physical display arrangement of the display units. In this manner, the computing device is accurately configured to utilize multiple displays without requiring the user to manually change the operating system settings of the computing device.

20 Claims, 4 Drawing Sheets

(56) References Cited

U.S. PATENT DOCUMENTS

| | | | | |
|---|---|---|---|---|
| 2012/0326945 A1* | 12/2012 | Ellis | .................. | G06F 3/1423 |
| | | | | 345/1.1 |
| 2013/0093659 A1* | 4/2013 | Nomura | .................. | G06F 3/013 |
| | | | | 345/156 |
| 2014/0292617 A1* | 10/2014 | Tejada Lacaci | ...... | G06F 3/1446 |
| | | | | 345/1.2 |
| 2014/0313408 A1* | 10/2014 | Sharma | .................. | G06F 3/1423 |
| | | | | 348/383 |
| 2015/0035998 A1* | 2/2015 | Mathew | .............. | H04N 5/2258 |
| | | | | 348/207.1 |
| 2016/0162243 A1 | 6/2016 | Neisler et al. | | |
| 2017/0124928 A1 | 5/2017 | Edwin et al. | | |

OTHER PUBLICATIONS

Kshitij Sharma, "Dual Eye Tracking for Pair Programming," Edic Research Proposal, Aug. 28, 2012, pp. 1-8.

Khamis et al., "EyeScout: Active Eye Tracking for Position and Movement Independent Gaze Interaction with Large Public Displays," Proceedings of the 30th Annual ACM Symposium on User Interface Software & Technology, Quebec City, QC, Canada, Oct. 22-25, 2017, pp. 155-166.

* cited by examiner

CONFIGURING COMPUTING DEVICE TO UTILIZE A MULTIPLE DISPLAY ARRANGEMENT BY TRACKING EYE MOVEMENT

TECHNICAL FIELD

The present invention relates generally to computing devices, and more particularly to configuring a computing device to utilize a multiple display arrangement by tracking the eye movement of the user.

BACKGROUND

Users working in a dynamic work environment, such as in a hot desking environment (office organization system which involves multiple workers using a single physical work station or surface during different time periods) or a pair programming environment (agile software development technique in which two programmers work together at one workstation), may frequently attach various monitors or display units (also referred to as simply "displays") to their computing systems at various positions with respect to their main computing device (e.g., laptop computer).

There are various advantages of using multiple monitors/displays. For example, users may be able to run multiple applications simultaneously. For example, the user may be able to view his/her e-mail on one display while browsing the web on the other display. In this manner, the use of multiple monitors/displays enhances productivity and multitasking. Furthermore, the use of multiple monitors/displays allows one to have critical information displayed on one screen for reference purposes while utilizing another screen for actual work. Also, the use of multiple monitors/displays allows one to make easy comparisons between files.

Currently, in order for the user to utilize multiple monitors/displays, the user must configure the computing device by manually changing the operating system settings of the computing device (e.g., indicate that the second display is to the left of the main display of the computing device) to utilize such a display arrangement in order to provide ease of movement between the monitors/displays (e.g., scrolling mouse across monitors/displays).

However, such a process is inefficient and may not accurately configure the computing device to utilize multiple displays in such an arrangement.

SUMMARY

In one embodiment of the present invention, a method for configuring a computing device to utilize a multiple display arrangement comprises detecting a user adding a second display unit to the computing device comprising a first display unit. The method further comprises tracking eye movement of the user in response to detecting the user adding the second display unit to the computing device. The method additionally comprises determining a logical display arrangement of the first and second display units based on the tracked eye movement of the user. Furthermore, the method comprises configuring the computing device to utilize the first and second display units in a particular display arrangement in response to verifying the logical display arrangement of the first and second display units matches a physical display arrangement of the first and second display units.

Other forms of the embodiment of the method described above are in a computing device and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, computing device and computer program product for configuring the computing device to utilize a multiple display arrangement. In one embodiment of the present invention, a second display unit that was added to a computing device by a user is detected, where the computing device includes a first display unit. The eye movement of the user is tracked using an eye tracker in response to detecting the user adding a second display unit to the computing device. A logical display arrangement of the multiple displays is then determined based on tracking the eye movement of the user. A "logical display arrangement," as used herein, refers to the arrangement of the displays with respect to each other (e.g., second display unit is to the right by x number of units and higher by y number of units with respect to the center of the first display unit) that is determined based on tracking the eye movement of the user. The computing device is then configured to utilize such a display arrangement of the first and second display units in response to verifying that the logical display arrangement of the first and second display units matches the actual physical display arrangement of the first and second display units. In one embodiment, such a verification may occur based on user input or based on a number of positive repetitive eye movements from the user. The "configuration" of the computing device to utilize the display arrangement of the first and second display units, as used herein, refers to configuring the settings (e.g., setting the position of the displays) on the computing device to establish ease of movement between the displays (e.g., scrolling mouse across monitors/displays) based on the determined arrangement of these displays, including situations where the second display unit is higher or lower as well as to the left or right of the first display unit. In one embodiment, the configuration is determined based on a data structure storing the settings to allow ease of movement between the displays having specific relative locations to one another, which are identified based on tracking the eye movement of the user. In this manner, the computing device is accurately configured to utilize multiple displays without requiring the user to manually change the operating system settings of the computing device.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
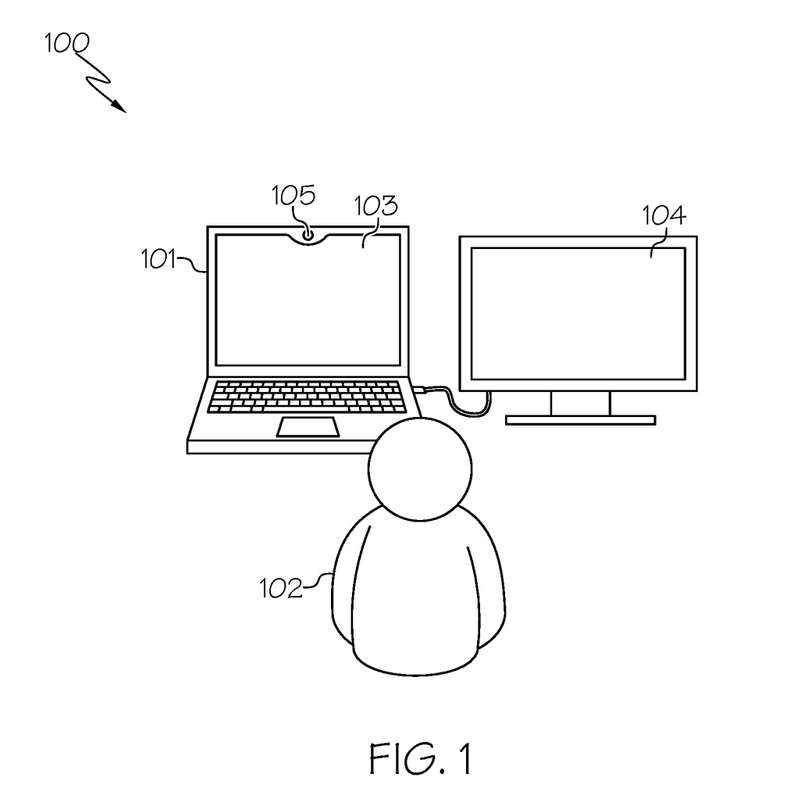
FIG. 1 illustrates a communication system for practicing the principles of the present invention in accordance with an embodiment of the present invention.

Referring now to the Figures in detail, FIG. 1 illustrates a communication system 100 configured in accordance with an embodiment of the present invention. System 100 includes a computing device 101 operated by a user 102. Computing device 101 may be any type of computing device (e.g., a portable computing unit, a Personal Digital Assistant (PDA), a mobile device, a tablet personal computer, a smartphone, a laptop computer, a mobile phone, a cellular phone, a navigation device, a gaming unit, a desktop computing device, a workstation, an Internet appliance and the like) configured with the capability of utilizing multiple monitors/displays. A description of an embodiment of a hardware configuration of computing device 101 is provided below in connection with FIG. 2.

Also, as shown in FIG. 1, computing device 101 includes a monitor or a display unit 103 (also referred to herein as simply "display"). Furthermore, as shown in FIG. 1, user 102 utilizes a second monitor or display 104 (identified as "secondary display" in FIG. 1) attached to computing device 101. In this manner, user 102 is able to utilize multiple monitors/displays at the same time. While FIG. 1 illustrates secondary display 104 being to the right of computing device 101, secondary display 104 may be located on either side of computing device 101. Furthermore, secondary display 104 may not necessarily be located on the same horizontal plane as computing device 101. In such a scenario, secondary display 104 may be positioned higher or lower with respect to display 103.

Furthermore, while FIG. 1 illustrates user 102 using two displays 103, 104 concurrently, the principles of the present invention are to include embodiments where user 102 utilizes more than two displays concurrently. That is, embodiments of the present invention are directed to the use of two or more monitors/displays by user 102 concurrently, where computing device 101 is configured to utilize two or more displays in a particular arrangement by tracking the eye movement of user 102 as discussed further below.

In one embodiment, computing device 101 utilizes an eye tracker 105 to track the eye gaze or focus of user 102. In one embodiment, eye tracker 105 is positioned on computing device 101 as shown in FIG. 1. Alternatively, eye tracker 105 may be head-mounted on user 102. In such an embodiment, the head-mounted eye tracker is connected to computing device 101 via a network (not shown).

In one embodiment, eye tracker 105 includes a light source and a camera. In one embodiment, the light source (usually infrared) is directed toward the eye. The camera tracks the reflection of the light source along with visible ocular features, such as the pupil. This data is used to extrapolate the rotation of the eye and ultimately the direction of gaze. Additional information, such as blink frequency and changes in pupil diameter, are also detected by eye tracker 105. The aggregated data is written to a file that is compatible with eye-tracking analysis software, such as EyeWorks™.

In one embodiment, eye tracker 105 corresponds to a web camera to track the eye gaze of user 102. In such an embodiment, the web camera detects the location of the face of user 102 followed by detecting the location of the eyes within the face of user 102 followed by detecting the orientation of the left and right eye and then mapping the orientation of the eyes onto the screen coordinate system. In one embodiment, calibration is relied upon to perform the mapping. In one embodiment, the calibration is performed by exposing a number of calibration points on the screen (e.g., display 103, 104) and then asking user 102 to look at those points in order to build a model.

In one embodiment, eye tracker 105 (e.g., Tobii® IS4 Platform) consists of sensors (e.g., camera and projectors) and utilizes algorithms (e.g., application 204) executed by the processor of computing device 101. In one embodiment, eye tracker 105 includes micro projectors which are used to create a reflection pattern of near-infrared light on the eyes. Furthermore, eye tracker 105 includes sensors to capture high frame-rate images of the user's eyes and reflection patterns. The algorithms (image-processing algorithms) executed by the processor of computing device 101 identifies the specific details in the user's eyes and reflection patterns and interprets the image stream generated by the sensors. The algorithms calculate the user's eyes and gaze point.

In one embodiment, eye tracker 105 uses models of the eye of user 102 to determine where the pupil of user 102 is located. That is, eye tracker 105 uses models of the eye to determine where the pupil of user 102 is located. Eye tracker 105 then estimates the gaze of user 102 using the eye position of user 102 and image processing techniques to determine where the user is looking. As discussed above, gaze may be determined by shining light (e.g., infrared light) into the eye of user 102. This creates a glint in the eye that is consistently located at the same point on the surface of the eye. Thus, the gaze of the user can be calculated using the distance between the pupil and the glint.

In one embodiment, computing device 101 determines the logical display arrangement of displays 103, 104 based on the estimated gaze of user 102. A "logical display arrangement," as used herein, refers to the arrangement of the displays with respect to each other (e.g., second display unit is to the right by x number of units and higher by y number of units with respect to the center of the first display unit) that is determined based on tracking the eye movement of the user. For example, eye tracker 105 determines the location that is focused by user 102 based on tracking the eye gaze of user 102, such as in terms of (x, y) coordinates. In one embodiment, such focused locations are determined based on the time that user 102 is gazing that location. For instance, if user 102 is gazing at a location, such as a location on secondary display 104, that exceeds a threshold amount of time, then such a location is said to be a location focused by user 102. In one embodiment, such locations are mapped to a screen coordinate system, such as (x, y) coordinates. In this manner, computing device 101 is able to deduce a second display unit being connected to computing device 101, and the location of such a display unit. As a result, computing device 101 is able to determine a logical display arrangement of displays 103, 104. For example, computing device 101 may determine that secondary display 104 is located to the right of computing device 101 by x number of units.

In one embodiment, computing device 101 may continue to determine and update the logical display arrangement of the displays until the logical display arrangement of the displays (e.g., display 103, 104) is verified to correspond to the actual physical display arrangement of the displays (e.g., displays 103, 104). The "physical display arrangement," as used herein, refers to the actual arrangement of these displays 103, 104, including situations where secondary display 104 is higher or lower as well as to the left or right of display 103. In one embodiment, the logical display arrangement of the displays is verified to match the physical display arrangement of the displays based on user input, such as where the user manually inputs to computing device 101, such as via a user interface, confirming that the logical display arrangement matches the physical display arrangement. Alternatively, such verification may occur based on positive repetitive eye movements from user 102. That is, such verification may occur based on user 102 repeatedly confirming the display arrangement, such as for a threshold number of times, which may be user-specified.

Upon verifying that the logical display arrangement of the displays matches the physical display arrangement of the displays, computing device 101 is configured to utilize such a display arrangement of the displays (e.g., displays 103, 104). The "configuration" of computing device 101 to utilize the display arrangement of the displays, as used herein, refers to configuring the settings (e.g., setting the position of the displays) on computing device 101 to establish ease of movement between the displays (e.g., scrolling mouse across monitors/displays) based on the determined arrangement of these displays, including situations where the second display unit (e.g., display 104) is higher or lower as well as to the left or right of the first display unit (e.g., display 103). In one embodiment, the configuration is determined based on a data structure storing the settings to allow ease of movement between the displays having specific relative locations to one another, which are identified based on tracking the eye movement of user 102. In this manner, the computing device is accurately configured to utilize multiple displays without requiring the user to manually change the operating system settings of the computing device.

System 100 is not to be limited in scope to any one particular architecture. System 100 may include any number of computing devices 101, users 102, displays 103, 104, and eye trackers 105.

Figure 2:
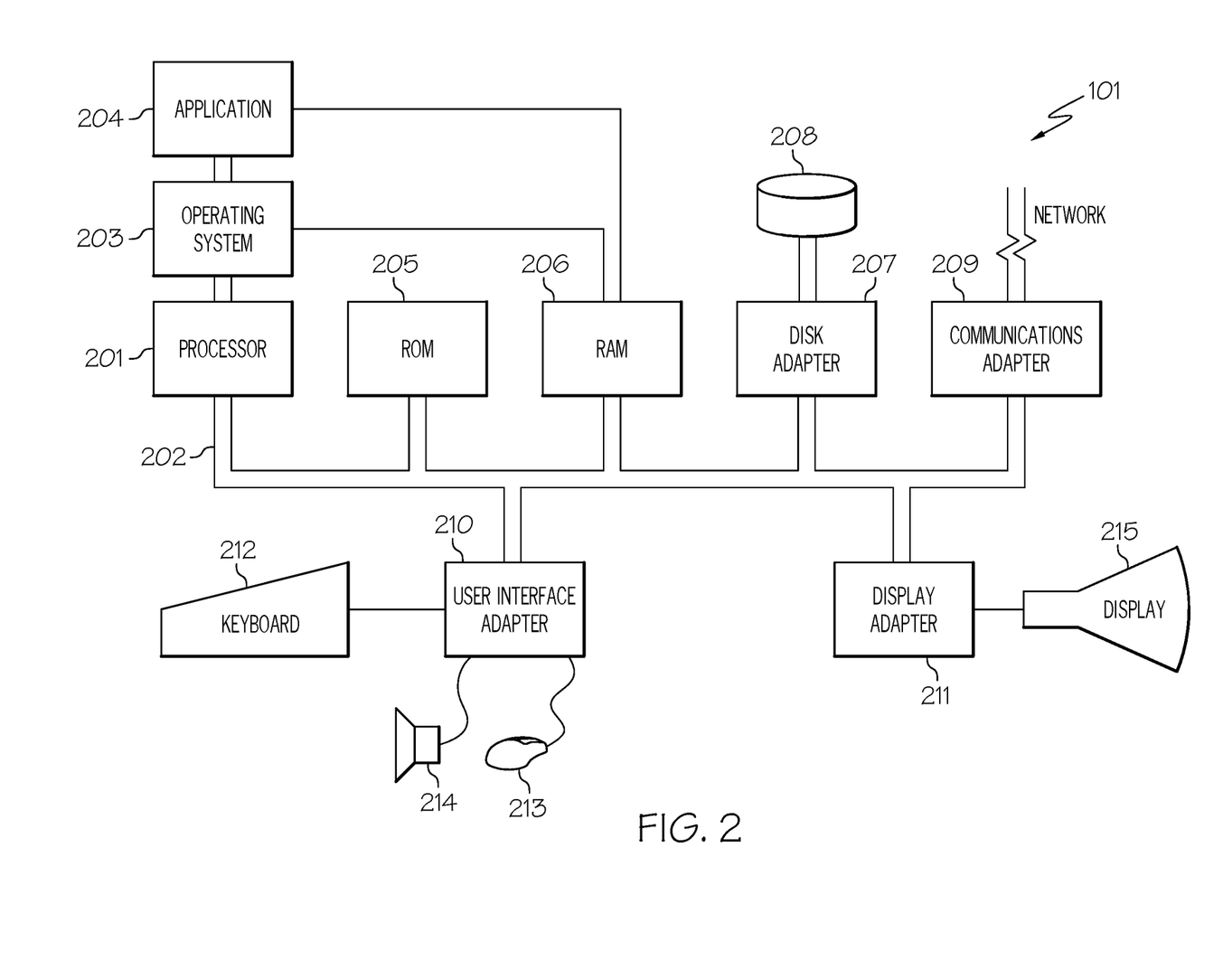
FIG. 2 illustrates an embodiment of the present invention of a hardware configuration of a computing device which is representative of a hardware environment for practicing the present invention.

Referring now to FIG. 2, FIG. 2 illustrates an embodiment of the present invention of the hardware configuration of computing device 101 (FIG. 1) which is representative of a hardware environment for practicing the present invention. Referring to FIG. 2, computing device 101 may have a processor 201 coupled to various other components by system bus 202. An operating system 203 may run on processor 201 and provide control and coordinate the functions of the various components of FIG. 2. An application 204 in accordance with the principles of the present invention may run in conjunction with operating system 203 and provide calls to operating system 203 where the calls implement the various functions or services to be performed by application 204. Application 204 may include, for example, eye-tracking analysis software or a program for accurately configuring the computing device to utilize multiple displays in a particular arrangement as discussed further below in connection with FIGS. 3-4.

Referring again to FIG. 2, read-only memory ("ROM") 205 may be coupled to system bus 202 and include a basic input/output system ("BIOS") that controls certain basic functions of computing device 101. Random access memory ("RAM") 206 and disk adapter 207 may also be coupled to system bus 202. It should be noted that software components including operating system 203 and application 204 may be loaded into RAM 206, which may be computing device's 101 main memory for execution. Disk adapter 207 may be an integrated drive electronics ("IDE") adapter that communicates with a disk unit 208, e.g., disk drive. It is noted that the program for accurately configuring the computing device to utilize multiple displays in a particular arrangement, as discussed further below in connection with FIGS. 3-4, may reside in disk unit 208 or in application 204.

Computing device 101 may further include a communications adapter 209 coupled to bus 202. Communications adapter 209 may interconnect bus 202 with an outside network thereby allowing computing device 101 to communicate with other devices.

I/O devices may also be connected to computing device 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to computing device 101 through keyboard 212 or mouse 213 and receiving output from computing device 101 via display 215 or speaker 214. Other input mechanisms may be used to input data to computing device 101 that are not shown in FIG. 2, such as display 215 having touch-screen capability and keyboard 212 being a virtual keyboard. Computing device 101 of FIG. 2 is not to be limited in scope to the elements depicted in FIG. 2 and may include fewer or additional elements than depicted in FIG. 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, users working in a dynamic work environment, such as in a hot desking environment (office organization system which involves multiple workers using a single physical work station or surface during different time periods) or a pair programming environment (agile software development technique in which two programmers work together at one workstation), may frequently attach various monitors or display units (also referred to as simply "displays") to their computing systems at various positions with respect to their main computing device (e.g., laptop computer). Currently, in order for the user to utilize multiple monitors/displays, the user must configure the computing device by manually changing the operating system settings of the computing device (e.g., indicate that the second display is to the left of the main display of the computing device) to utilize such a display arrangement in order to provide ease of movement between the monitors/displays (e.g., scrolling mouse across monitors/displays). However, such a process is inefficient and may not accurately configure the computing device to utilize multiple displays in such an arrangement.

Figure 3:
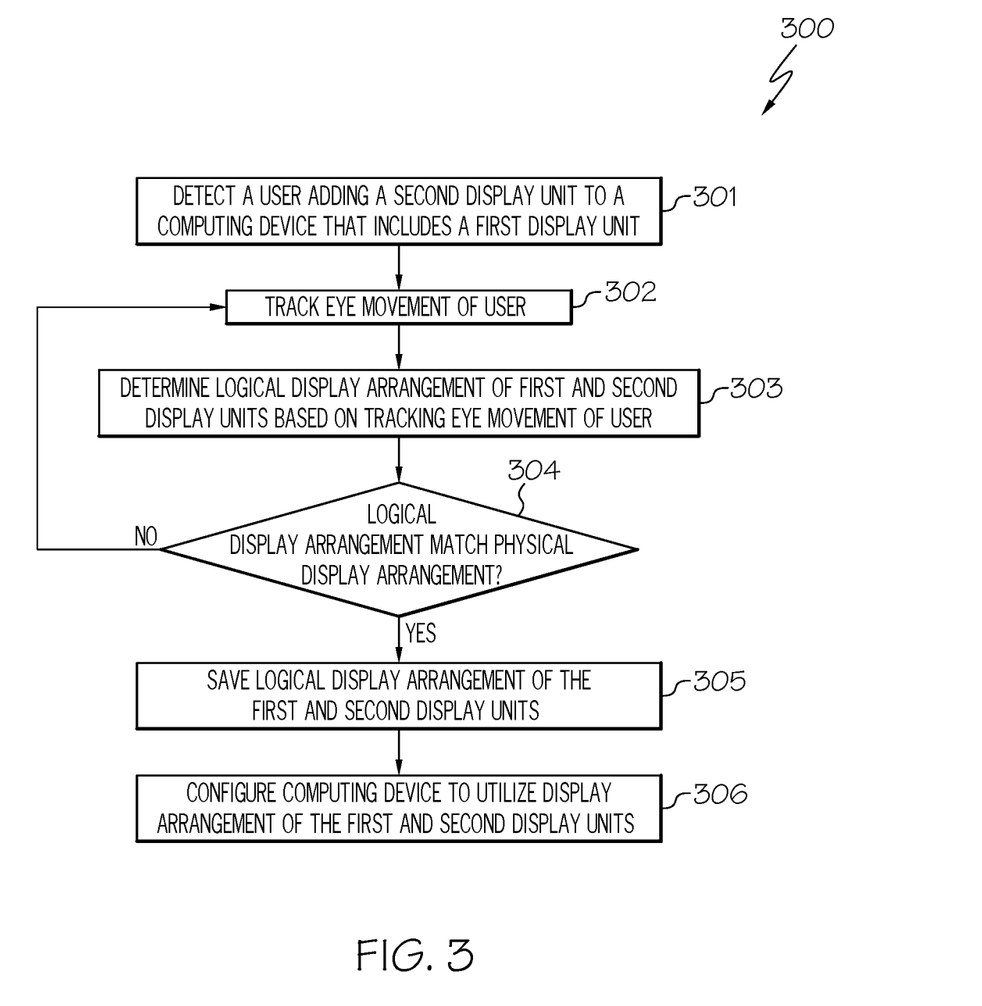
FIG. 3 is a flowchart of a method for configuring a computing device to utilize multiple displays in a particular arrangement in accordance with an embodiment of the present invention.
Figure 4:
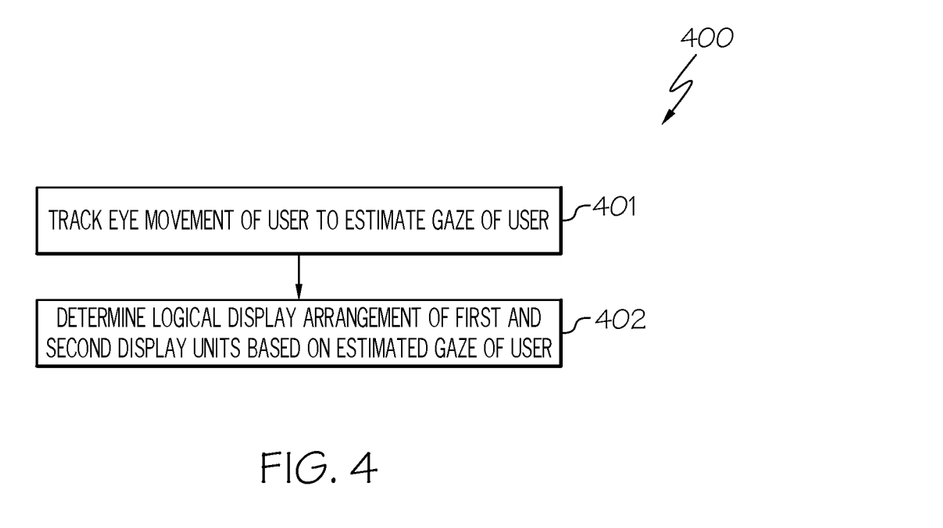
FIG. 4 is a flowchart of a method for determining the logical display arrangement of multiple displays based on tracking the eye movement of the user in accordance with an embodiment of the present invention.

Embodiments of the present invention provide a means for accurately configuring the computing device to utilize multiple displays in a particular arrangement without requiring the user to manually change the operating system settings of the computing device as discussed below in connection with FIGS. 3 and 4. FIG. 3 is a flowchart of a method for configuring a computing device to utilize multiple displays in a particular arrangement. FIG. 4 is a flowchart of a method for determining the logical display arrangement of multiple displays based on tracking the eye movement of the user.

As stated above, FIG. 3 is a flowchart of a method 300 for configuring a computing device to utilize multiple displays in a particular arrangement in accordance with an embodiment of the present invention.

Referring to FIG. 3, in conjunction with FIGS. 1-2, in step 301, computing device 101 detects user 102 adding a second display unit (e.g., display 104) to computing device 101 that includes a first display unit (e.g., display 103). In one embodiment, computing device 101 detects user 102 adding a second display unit based on detecting the second display unit (e.g., display 104) being connected to computing device 101 via a High-Definition Multimedia Interface (HDMI) port or a Universal Serial Bus (USB) port. In one embodiment, user 102 may manually indicate to computing device 101 that there are multiple displays connected to computing device 101, such as via a user interface (e.g., selecting multiple displays option via the control panel).

In step 302, computing device 101 tracks the eye movement of user 102 using eye tracker 105 in response to detecting user 101 adding the second display unit (e.g., display 104) to computing device 101. As discussed above, in one embodiment, computing device 101 utilizes an eye tracker 105 to track the eye gaze or focus of user 102.

In step 303, computing device 101 determines the logical display arrangement of the first and second display units (e.g., displays 103, 104) based on tracking the eye movement of user 102. A description of an embodiment determining the logical display arrangement of multiple displays (e.g., displays 103, 104) based on tracking the eye movement of user 102 is provided below in connection with FIG. 4. As discussed above, the "logical display arrangement," as used herein, refers to the arrangement of the displays with respect to each other (e.g., second display unit is to the right by x number of units and higher by y number of units with respect to the center of the first display unit) that is determined based on tracking the eye movement of the user.

FIG. 4 is a flowchart of a method 400 for determining the logical display arrangement of multiple displays based on tracking the eye movement of the user in accordance with an embodiment of the present invention.

Referring to FIG. 4, in conjunction with FIGS. 1-3, in step 401, computing device 101 tracks the eye movement of user 102 to estimate the gaze of user 102.

In step 402, computing device 101 determines the logical display arrangement of the first and second display units (e.g., displays 103, 104) based on the estimated gaze of user 102.

As discussed above, in one embodiment, eye tracker 105 includes a light source and a camera. In one embodiment, the light source (usually infrared) is directed toward the eye. The camera tracks the reflection of the light source along with visible ocular features, such as the pupil. This data is used to extrapolate the rotation of the eye and ultimately the direction of gaze. Additional information, such as blink frequency and changes in pupil diameter, are also detected by eye tracker 105. The aggregated data is written to a file that is compatible with eye-tracking analysis software, such as EyeWorks™.

In one embodiment, eye tracker 105 corresponds to a web camera to track the eye gaze of user 102. In such an embodiment, the web camera detects the location of the face of user 102 followed by detecting the location of the eyes within the face of user 102 followed by detecting the orientation of the left and right eye and then mapping the orientation of the eyes onto the screen coordinate system. In one embodiment, calibration is relied upon to perform the mapping. In one embodiment, the calibration is performed by exposing a number of calibration points on the screen (e.g., display 103, 104) and then asking user 102 to look at those points in order to build a model.

In one embodiment, eye tracker 105 (e.g., Tobii® IS4 Platform) consists of sensors (e.g., camera and projectors) and utilizes algorithms (e.g., application 204) executed by the processor of computing device 101. In one embodiment, eye tracker 105 includes micro projectors which are used to create a reflection pattern of near-infrared light on the eyes. Furthermore, eye tracker 105 includes sensors to capture high frame-rate images of the user's eyes and reflection patterns. The algorithms (image-processing algorithms) executed by the processor of computing device 101 identifies the specific details in the user's eyes and reflection patterns and interprets the image stream generated by the sensors. The algorithms calculate the user's eyes and gaze point.

In one embodiment, computing device 101 determines the logical display arrangement of displays 103, 104 based on the estimated gaze of user 102. A "logical display arrangement," as used herein, refers to the arrangement of the displays with respect to each other (e.g., second display unit is to the right by x number of units and higher by y number of units with respect to the center of the first display unit) that is determined based on tracking the eye movement of the user. For example, eye tracker 105 determines the location that is focused by user 102 based on tracking the eye gaze of user 102, such as in terms of (x, y) coordinates. In one embodiment, such focused locations are determined based on the time that user 102 is gazing that location. For instance, if user 102 is gazing at a location, such as a location on secondary display 104, that exceeds a threshold amount of time, then such a location is said to be a location focused by user 102. In one embodiment, such locations are mapped to a screen coordinate system, such as (x, y) coordinates. In this manner, computing device 101 is able to deduce a second display unit being connected to computing device 101, and the location of such a display unit. As a result, computing device 101 is able to determine a logical display arrangement of displays 103, 104. For example, computing device 101 may determine that secondary display 104 is located to the right of computing device 101 by x number of units.

Returning to FIG. 3, in conjunction with FIGS. 1-2 and 4, in step 304, a determination is made by computing device 101 as to whether the logical display arrangement of the first and second display units (e.g., displays 103, 104) matches the physical display arrangement of the first and second display units (e.g., displays 103, 104). As stated above, the "physical display arrangement," as used herein, refers to the actual arrangement of these displays 103, 104, including situations where secondary display 104 is higher or lower as well as to the left or right of display 103.

In one embodiment, the logical display arrangement of the displays is verified to match the physical display arrangement of the displays based on user input, such as where the user manually inputs to computing device 101, such as via a user interface, confirming that the logical display arrangement matches the physical display arrangement. Alternatively, such verification may occur based on positive repetitive eye movements from user 102. That is, such verification may occur based on user 102 repeatedly confirming the display arrangement, such as for a threshold number of times, which may be user-specified.

If the logical display arrangement of the first and second display units (e.g., displays 103, 104) does not match the physical display arrangement of the first and second display units (e.g., displays 103, 104), then computing device 101 continues to track the eye movement of user 102 in step 302 and continues to determine the logical display arrangement of the displays based on the tracked eye movement of user 102 in step 303.

If, however, the logical display arrangement of the first and second display units (e.g., displays 103, 104) matches the physical display arrangement of the first and second display units (e.g., displays 103, 104), then, in step 305, computing device 101 saves the logical display arrangement of the first and second display units (e.g., displays 103, 104), such as in a storage unit (e.g., memory 205, disk unit 208). In one embodiment, the logical display arrangement of the displays is saved for a specific number of displays (e.g., two displays). As a result, computing device 101 is able to reapply the logical display arrangement of the displays in response to detecting the same number of display units (e.g., two display units) being connected to computing device 101.

In step 306, computing device 101 configures computing device 101 to utilize such a display arrangement of the displays (e.g., displays 103, 104). The "configuration" of computing device 101 to utilize the display arrangement of the displays, as used herein, refers to configuring the settings (e.g., setting the position of the displays) on computing device 101 to establish ease of movement between the displays (e.g., scrolling mouse across monitors/displays) based on the determined arrangement of these displays, including situations where the second display unit (e.g., display 104) is higher or lower as well as to the left or right of the first display unit (e.g., display 103). In one embodiment, the configuration is determined based on a data structure storing the settings to allow ease of movement between the displays having specific relative locations to one another, which are identified based on tracking the eye movement of user 102. In one embodiment, such a data structure is stored in a storage unit (e.g., memory 205, disk unit 208) of computing device 101.

In this manner, embodiments of the present invention accurately configure the computing device to utilize multiple displays without requiring the user to manually change the operating system settings of the computing device.

While the foregoing discussed configuring the computing device to utilize two displays, the principles of the present invention may be applied to configuring the computing device to utilize greater than two displays.

Furthermore, in this manner, the functionality or capability of computing systems is improved by automatically configuring the computing device to utilize multiple displays in a particular arrangement without requiring the user to manually change the operating settings of the computing device. By not requiring the user to manually change the operating settings of the computing device, fewer computing resources (e.g., processing resource) need to be utilized thereby allowing the computing resources (e.g., processing resources) to be more efficiently utilized.

Furthermore, the present invention improves the technology or technical field involving computing devices. As discussed above, there are various advantages of using multiple monitors/displays. For example, users may be able to run multiple applications simultaneously. For example, the user may be able to view his/her e-mail on one display while browsing the web on the other display. In this manner, the use of multiple monitors/displays enhances productivity and multitasking. Furthermore, the use of multiple monitors/displays allows one to have critical information displayed on one screen for reference purposes while utilizing another screen for actual work. Also, the use of multiple monitors/displays allows one to make easy comparisons between files.

Currently, in order for the user to utilize multiple monitors/displays, the user must configure the computing device by manually changing the operating system settings of the computing device (e.g., indicate that the second display is to the left of the main display of the computing device) to utilize such a display arrangement in order to provide ease of movement between the monitors/displays (e.g., scrolling mouse across monitors/displays). However, such a process is inefficient and may not accurately configure the computing device to utilize multiple displays in such an arrangement.

The present invention improves such technology by accurately configuring the computing device to utilize multiple displays without requiring the user to manually change the operating system settings of the computing device. In this manner, there is an improvement in the technical field of computing devices.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for configuring a computing device to utilize a multiple display arrangement, the method comprising:
   detecting a user adding a second display unit to said computing device comprising a first display unit based on detecting said second display unit being connected to said computing device via a port or based on receiving manual input from said user by said computing device indicating that there are multiple displays connected to said computing device;
   tracking eye movement of said user using a head-mounted eye tracker connected to said computing device via a network in response to detecting said user adding said second display unit to said computing device;
   determining a logical display arrangement of said first and second display units based on said tracked eye movement of said user;
   in response to the determining the logical display arrangement, verifying the determined logical display arrangement of said first and second display units matches a physical display arrangement of said first and second display units based on a number of positive repetitive eye movements from said user; and
   configuring settings on said computing device to utilize said first and second display units in a particular display arrangement in response to verifying said logical display arrangement of said first and second display units matches said physical display arrangement of said first and second display units, wherein said configuration is determined based on a data structure storing settings to allow ease of movement between said first and second display units having specific relative locations to one another which are identified based on tracking said eye movement of said user.

2. The method as recited in claim 1 further comprising:
   estimating a gaze of said user based on said tracked eye movement of said user, wherein said estimated gaze of said user is used to identify a location focused by said user in response to said estimated gaze of said user at said location exceeding a threshold amount of time, wherein said location is mapped to a screen coordinate.

3. The method as recited in claim 2 further comprising: determining said logical display arrangement of said first and second display units based on said estimated gaze of said user.

4. The method as recited in claim 1 further comprising: saving said logical configuration of said display arrangement of said first and second display units in response to verifying said logical display arrangement of said first and second display units matches said physical display arrangement of said first and second display units.

5. The method as recited in claim 4 further comprising:
saving said logical configuration of said display arrangement of said first and second display units for a specific number of display units; and
reapplying said logical configuration of said display arrangement of said first and second display units in response to detecting said specific number of display units being connected to said computing device.

6. The method as recited in claim 1, wherein said verification occurs based on said user repeatedly confirming said physical display arrangement a threshold number of times.

7. The method as recited in claim 1, wherein said logical display arrangement of said first and second display units comprises said second display unit being higher or lower as well as to the left or right of said first display unit.

8. A computer program product for configuring a computing device to utilize a multiple display arrangement, the computer program product comprising a computer readable storage medium having program code embodied therewith, the program code comprising the programming instructions for:
detecting a user adding a second display unit to said computing device comprising a first display unit based on detecting said second display unit being connected to said computing device via a port or based on receiving manual input from said user by said computing device indicating that there are multiple displays connected to said computing device;
tracking eye movement of said user using a head-mounted eye tracker connected to said computing device via a network in response to detecting said user adding said second display unit to said computing device;
determining a logical display arrangement of said first and second display units based on said tracked eye movement of said user;
in response to the determining the logical display arrangement, verifying the logical display arrangement of said first and second display units matches a physical display arrangement of said first and second display units based on a number of positive repetitive eye movements from said user; and
configuring settings on said computing device to utilize said first and second display units in a particular display arrangement in response to verifying said logical display arrangement of said first and second display units matches said physical display arrangement of said first and second display units, wherein said configuration is determined based on a data structure storing settings to allow ease of movement between said first and second display units having specific relative locations to one another which are identified based on tracking said eye movement of said user.

9. The computer program product as recited in claim 8, wherein the program code further comprises the programming instructions for:
estimating a gaze of said user based on said tracked eye movement of said user, wherein said estimated gaze of said user is used to identify a location focused by said user in response to said estimated gaze of said user at said location exceeding a threshold amount of time, wherein said location is mapped to a screen coordinate.

10. The computer program product as recited in claim 9, wherein the program code further comprises the programming instructions for:
determining said logical display arrangement of said first and second display units based on said estimated gaze of said user.

11. The computer program product as recited in claim 8, wherein the program code further comprises the programming instructions for:
saving said logical configuration of said display arrangement of said first and second display units in response to verifying said logical display arrangement of said first and second display units matches said physical display arrangement of said first and second display units.

12. The computer program product as recited in claim 11, wherein the program code further comprises the programming instructions for:
saving said logical configuration of said display arrangement of said first and second display units for a specific number of display units; and
reapplying said logical configuration of said display arrangement of said first and second display units in response to detecting said specific number of display units being connected to said computing device.

13. The computer program product as recited in claim 8, wherein said verification occurs based on said user repeatedly confirming said physical display arrangement a threshold number of times.

14. The computer program product as recited in claim 8, wherein said logical display arrangement of said first and second display units comprises said second display unit being higher or lower as well as to the left or right of said first display unit.

15. A computing device, comprising:
a memory for storing a computer program for configuring said computing device to utilize a multiple display arrangement; and
a processor connected to said memory, wherein said processor is configured to execute the program instructions of the computer program comprising:
detecting a user adding a second display unit to said computing device comprising a first display unit based on detecting said second display unit being connected to said computing device via a port or based on receiving manual input from said user by said computing device indicating that there are multiple displays connected to said computing device;
tracking eye movement of said user using a head-mounted eye tracker connected to said computing device via a network in response to detecting said user adding said second display unit to said computing device;
determining a logical display arrangement of said first and second display units based on said tracked eye movement of said user;
in response to the determining the logical display arrangement, verifying the logical display arrangement of said first and second display units matches a physical display arrangement of said first and second display units based on a number of positive repetitive eye movements from said user; and configuring settings on said computing device to utilize said first and second display units in a particular display arrangement in response to verifying said logical display arrangement of said first and second display units matches said physical display arrangement of said first and second display units, wherein said configuration is determined based on a data structure storing settings to allow ease of movement between said first and second display units having specific relative locations to one another which are identified based on tracking said eye movement of said user.

16. The computing device as recited in claim 15, wherein the program instructions of the computer program further comprise:

estimating a gaze of said user based on said tracked eye movement of said user, wherein said estimated gaze of said user is used to identify a location focused by said user in response to said estimated gaze of said user at said location exceeding a threshold amount of time, wherein said location is mapped to a screen coordinate.

17. The computing device as recited in claim 16, wherein the program instructions of the computer program further comprise:

determining said logical display arrangement of said first and second display units based on said estimated gaze of said user.

18. The computing device as recited in claim 15, wherein the program instructions of the computer program further comprise:

saving said logical configuration of said display arrangement of said first and second display units in response to verifying said logical display arrangement of said first and second display units matches said physical display arrangement of said first and second display units.

19. The computing device as recited in claim 18, wherein the program instructions of the computer program further comprise:

saving said logical configuration of said display arrangement of said first and second display units for a specific number of display units; and reapplying said logical configuration of said display arrangement of said first and second display units in response to detecting said specific number of display units being connected to said computing device.

20. The computing device as recited in claim 15, wherein said verification occurs based on said user repeatedly confirming said physical display arrangement a threshold number of times.

* * * * *